(12) United States Patent
Inotsuka

(10) Patent No.: US 9,279,493 B2
(45) Date of Patent: Mar. 8, 2016

(54) SEALED SWITCH AND METHOD FOR REDUCING AN INTERNAL PRESSURE IN SEALED SWITCH

(71) Applicant: Valeo Japan Co., Ltd., Tokyo (JP)

(72) Inventor: Tetsuya Inotsuka, Tokyo (JP)

(73) Assignee: Niles Co., Ltd. (JP)

( * ) Notice: Subject to any disclaimer, the term of this patent is extended or adjusted under 35 U.S.C. 154(b) by 172 days.

(21) Appl. No.: 13/890,601

(22) Filed: May 9, 2013

(65) Prior Publication Data

US 2013/0306448 A1    Nov. 21, 2013

(30) Foreign Application Priority Data

May 18, 2012   (JP) .................................. 2012-114000

(51) Int. Cl.
| | | |
|---|---|---|
| H01H 13/06 | (2006.01) | |
| H01H 21/08 | (2006.01) | |
| F16H 59/10 | (2006.01) | |
| F16H 59/02 | (2006.01) | |
| F16H 59/68 | (2006.01) | |
| H01H 19/06 | (2006.01) | |
| H01H 1/20 | (2006.01) | |
| H01H 1/58 | (2006.01) | |

(52) U.S. Cl.
CPC .......... *F16H 59/105* (2013.01); *F16H 59/0278* (2013.01); *F16H 59/68* (2013.01); *H01H 19/06* (2013.01); *B60Y 2400/301* (2013.01); *F16H 2059/6823* (2013.01); *H01H 1/20* (2013.01); *H01H 1/5866* (2013.01); *H01H 2300/02* (2013.01); *Y10T 29/49105* (2015.01)

(58) Field of Classification Search
CPC . H01H 19/58; H01H 2300/02; H01H 19/585; H01H 11/06

USPC .............. 200/11 R, 571, 61.88, 302.2, 302.3; 277/903, 908, 306, 352, 425
See application file for complete search history.

(56) References Cited

U.S. PATENT DOCUMENTS

| | | | | |
|---|---|---|---|---|
| 5,577,605 | A | * 11/1996 | Dilly et al. | ..................... 200/564 |
| 6,897,386 | B2 | * 5/2005 | Nakazawa et al. | ......... 200/61.88 |
| 7,078,639 | B2 | * 7/2006 | Poyner | .......................... 200/334 |

(Continued)

FOREIGN PATENT DOCUMENTS

| | | |
|---|---|---|
| EP | 0 661 481 A2 | 7/1995 |
| EP | 0 895 004 A2 | 2/1999 |
| JP | 3956433 B2 | 5/2007 |

OTHER PUBLICATIONS

Extended European Search Report issued Sep. 2, 2013 for corresponding European Application No. 13 00 2502.

*Primary Examiner* — Renee Luebke
*Assistant Examiner* — Ahmed Saeed
(74) *Attorney, Agent, or Firm* — Fishman Stewart Yamaguchi PLLC

(57) ABSTRACT

A movable board with movable contact points is arranged inside a switch case formed by overlap of a substrate with fixed contact points and a lid body. A top end surface of the substrate has a concave streak portion and a ring groove for accommodating a seal ring, wherein a projecting streak portion provided on a lower surface of a flange portion in the lid body is fitted in the concave streak portion for welding. A seal bearing mounted to shaft holes provided on an opposing portion between the substrate and the lid body comprises a cylindrical body portion fitted in at least one of the shaft holes, and a lip-shaped seal portion extending to a side of a rotary surface of a shaft portion from an inner peripheral surface of the body portion to make flexible contact with the rotary surface.

5 Claims, 13 Drawing Sheets

(56) References Cited

U.S. PATENT DOCUMENTS

| | | | |
|---|---|---|---|
| 8,946,575 B2 * | 2/2015 | Kikuchi | 200/302.2 |
| 2006/0118398 A1 * | 6/2006 | Muneyoshi et al. | 200/302.2 |
| 2009/0309308 A1 * | 12/2009 | Jorgensen et al. | 277/306 |
| 2013/0075973 A1 * | 3/2013 | Dauphinais | 277/306 |
| 2014/0203513 A1 * | 7/2014 | Peterson et al. | 277/352 |
| 2014/0233359 A1 * | 8/2014 | Ishida et al. | 368/290 |

\* cited by examiner

Fig.9
(A) 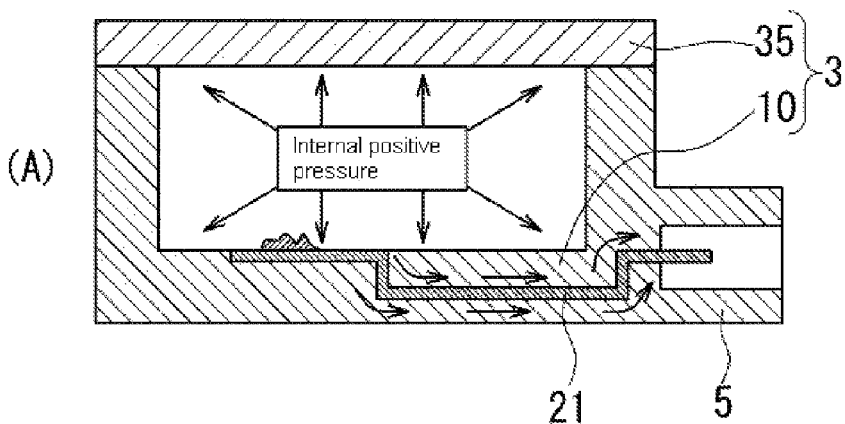
(B) 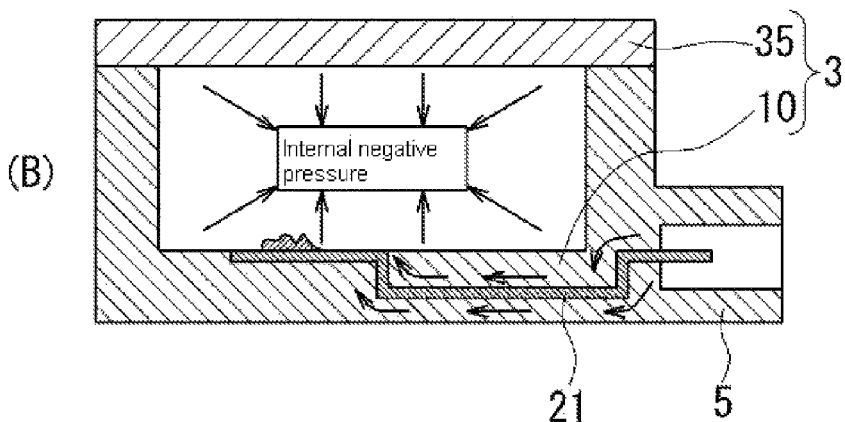
(C) 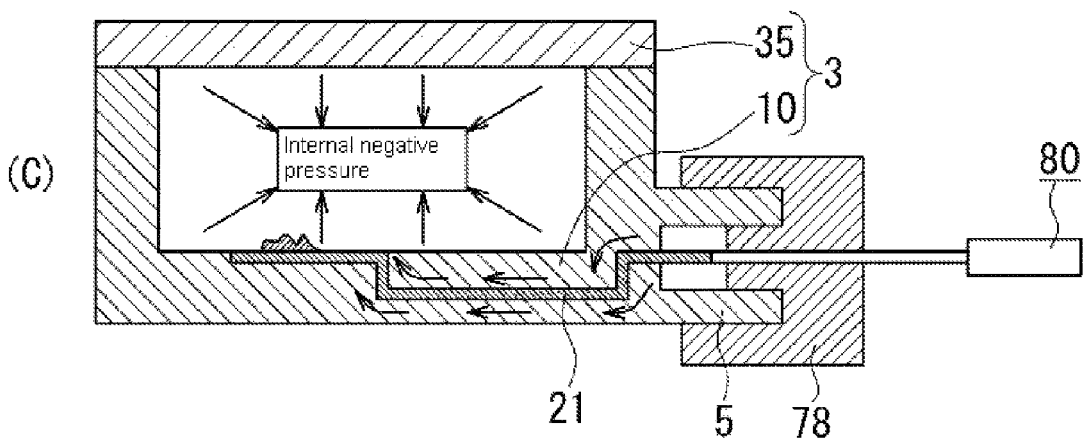

SEALED SWITCH AND METHOD FOR REDUCING AN INTERNAL PRESSURE IN SEALED SWITCH

CROSS-REFERENCE TO RELATED APPLICATION

This application claims priority under 35 USC 119 from Japanese Patent Application No. 2012-114000 filed on May 18, 2012, the disclosure of which is incorporated by reference herein.

BACKGROUND OF THE INVENTION

1. Field of the Invention

The present invention relates to a sealed switch and a method for reducing an internal pressure in the sealed switch.

2. Description of the Related Art

There is known a neutral start switch (inhibitor switch) mounted on a vehicle to be used for detection of a selection range of a shift lever, as an example of this kind of sealed switch.

FIG. 10 shows a typical configuration of the neutral start switch. The neutral start switch 1 is configured such that a switch case 3 is formed of a plastic substrate 10 (polar substrate) and a lid body 35. Fixed contact points 20 of the neutral start switch 1 are mounted on the substrate 10 by insert molding, and movable contact points 54 which are connected to/disconnected from the fixed contact points 20 are arranged in a movable board 50 movably arranged in the switch case 3. The movable board 50 is rotatably supported through a shaft portion 55 to seal bearings 67 inserted into shaft holes 45 and 15 provided in the opposing portion between the lid body 35 and the substrate 10. The substrate 10 is formed in a fan shape on the basis of the shaft holes 45 and 15.

The fixed contact points 20 are specifically mounted to a plurality of rows of arc-shaped fixed-contact point mount portions 68 around the shaft holes 45 and 15 by insert molding. The movable contact point 54 is connected to/disconnected from the fixed contact point 20 with rotation of the movable board around the shaft holes 45 and 15, and the connection/disconnection allows the fixed contact point 20 and the movable contact point 54 to be electrically connected/disconnected, which thus performs the switching operation.

The fixed contact point 20 and the movable contact point 54 are coated with contact point grease for improving durability thereof and current-carrying properties at the contacting thereof. The fixed contact point 20 is provided with a connecting piece portion 21 integral therewith, and the connecting piece portion 21 is formed to be integral with the substrate 10 by insert molding as described above. The connecting piece portion 21 extends toward a connector portion 5 inside the substrate 10 and is exposed to an outside as a terminal of the connector portion 5 projecting from an outer surface of a side wall 12 of the substrate 10 to an outside.

The neutral start switch 1 is provided with seal bearings 67 between the shaft portion 55 of the movable board 50 and the shaft holes 45 and 15 for preventing water, mud or the like from entering into the switch case 3. In addition, the substrate 10 and the lid body 35 are air-tightly jointed with each other across the entire circumference of the substrate 10 and the lid body 35 by welding, and a seal ring (described later) is provided between joint surfaces of the substrate 10 and the lid body 35.

In a case of jointing the substrate 10 and the lid body 35 in the neutral start switch 1 by welding, a high joint strength is necessary. Therefore conventionally a share joint method excellent in the welding performance and a welding structure suitable for the share joint method are adopted.

FIGS. 11A and 11B and FIGS. 12A and 12B respectively show a welding structure (joint structure) between the substrate 10 and the lid body 35 in the neutral start switch 1 applied to the share joint method.

As shown in FIG. 11A, the substrate 10 is provided with a side wall 12 surrounding an entire circumference of the movable board 50 in a rotation region thereof and formed integrally with the substrate 10, and a ring groove 30 for accommodating the seal ring 31 and a concave streak portion 26 are formed on a top end surface 25 of the side wall 12 across the entire circumference of the side wall 12 in that order from the inside. A welding inclination surface 27 is formed in the depth of the concave streak portion 26 of the side wall 12 at an outer peripheral side. In addition, the lid body 35 is provided with a projecting streak portion 40 on a lower surface 38a of a flange portion 38 in the lid body 35 opposing the top end surface 25 of the side wall 12. The projecting portion 40 is fitted in the concave streak portion 26 of the side wall 12.

The projecting streak portion 40 extends across the entire circumference along a peripheral edge of the flange portion 38. A welding shoulder portion 41 for welding with the welding inclination surface 27 is formed in an intermediate portion of the projecting streak portion 40 at the outer peripheral side thereof. The welding inclination surface 27 and the welding shoulder portion 41 are configured such that when the top end surface 25 of the side wall 12 makes contact with the lower surface 38a of the lid body 35, the welding shoulder portion 41 of the projecting streak portion 40 is designed to interfere with the welding inclination surface 27 of the concave streak portion 26. As a result, when high-frequency welding causes the melting of the interference portion across the entire circumference, the projecting streak portion 40 and the side wall 12 are welded to be integral.

At the welding between the substrate 10 and the lid body 35, when the projecting portion streak 40 of the lid body 35 is in the process of being inserted into the concave streak portion 26 of the substrate 10 while interposing the movable board 50 between the substrate 10 and the lid body 35, as shown in FIG. 11B a corner of the welding shoulder portion 41 of the projecting streak portion 40 first makes contact with the welding inclination surface 27 of the concave streak portion 26. In this state a gap S1 remains between the top end surface 25 of the side wall 12 and the lower surface 38a of the lid body 35. The ring groove 30 has a depth smaller than a diameter of the seal ring 31 in a free state (no load state), and the seal ring 31 partly projects from the ring groove 30.

As the lid body 35 is further pressed to the substrate 10 from a position of FIG. 11B in the high-frequency applied state, the interference (overlap) portion between the welding shoulder portion 41 and the welding inclination surface 27 is melted, and the lid body 35 moves in the approaching direction relatively to the substrate 10. In addition, as shown in FIG. 12A after the lower surface 38a of the lid body 35 makes contact with the seal ring 31 in the ring groove 30, it presses the seal ring 31, and finally, as shown in FIG. 12B, the lower surface 38a of the lid body 35 is seated on the top end surface 25. Then the projecting streak portion 40 and the side wall 12 are jointed across the entire circumference by welding, and along with it, the inside of the switch case 3 becomes in a sealing condition by flexible deformation of the seal ring 31 between the side wall 12 and the lower surface 38a of the lid body 35.

In such a welding structure, however, the neutral start switch 1 is sealed by the sealing operation across the entire circumference of the seal ring 31, but there are some cases where the connector portion 5 gets wet with grease. In this situation, there is a possibility that durability of the fixed contact point 20 and the movable contact point 54 is degraded, and in some cases the leak of the grease itself takes for the event that water exists inside the neutral start switch 1. Further, there is a problem that the outside appearance and visual quality of the neutral start switch 1 get worse since dusts adhere to the leaked grease.

The inventors have found out the following matter as a result of repeatedly diligently studying factors of this leakage of the grease.

(1) The leak of the grease cannot be confirmed near the seal ring 31.
(2) As the pressure in the switch case 3 is measured, it is raised to pressures equal to or more than an atmospheric pressure.

From the results of the above (1) and (2), it is estimated that the grease applied to the contact point, for example, the fixed contact point 20 flows on the interface between the fixed contact point 20 and the plastic, and leaks into the connector portion 5. In addition, although the conductive-metallic fixed contact point 20 is insert-molded to the plastic substrate 10, it is estimated that a perfectly adhesive state is not formed between the fixed contact point 20 and the plastic.

That is, in the joint structure of the substrate 10 and the lid body 35, since an inner space of the switch case 3 interposed between the substrate 10 and the lid body 35 starts to be blocked out from the outside from the position shown in FIG. 11B, the inner space is compressed by the gap S1 caused by the pushing movement of the lid body 35 during a period from the position in FIG. 11B to the joint completion shown in FIG. 12B. As a result, the welding shoulder portion 41 and the welding inclination surface 27 are welded with each other to increase the welding amount. During this period, the sealing operations between the shaft portion of the movable board 50 and the shaft holes 45 and 15 are also performed by the seal bearings 67, and the air inside the switch case 3 is not released to an atmosphere because of each structure of the switch case 3 and the seal bearing 67. Accordingly, it is estimated that the grease applied to the fixed contact point 20 in the substrate 10 is pushed out to the side of the connector portion 5 by the pressure in the switch case 3 after the welding between the substrate 10 and the lid body 35.

Accordingly, as described above, in the switch configured to form the sealed structure by interposing the seal ring 31 between the joint surfaces of the lid body 35 and the substrate 10, a hole for releasing the pressure in the switch case 3 is necessary.

It should be noted that Japanese Patent No. 3956433 discloses a technology that a breathing hole in response to a change in internal pressure of the switch case is provided in the switch case and a multi-hole semi-transparent film (Gore-Tex (registered trade mark)) is mounted to the breathing hole, thus suppressing a rise in the internal pressure of the switch case 3.

However, there occur problems that since the multi-hole semi transparent film is high in costs, it is difficult to adopt, since not only the multi-hole transparent film but also a film is exposed to an outside, it is susceptible to damages and the breathing is possibly difficult because of contamination of grease or the like, and at the time of picking switches and inspecting all of them, the measurement of internal pressures thereof is difficult because of difficulty in pressure measurement in the switch case through the breathing hole. In addition, for providing a hole of releasing a pressure in a plastic product, a change in a manufacturing line or an inspection line in regard to a mold, a line, an inspection or the like for the product is necessary, thereby creating a problem of increasing costs.

Therefore in the sealed switch, it is required to release a pressure inside the switch case without changing or modifying the structure thereof as much as possible.

SUMMARY OF THE INVENTION

Accordingly, the present invention is made in view of the above-described problems, and an object of the present invention is to provide a sealed switch which prevents water, mud and the like from entering into a switch case and at the same time, reduces a pressure in the switch case for preventing leakage of grease into a connector portion.

According to an aspect of the present invention, a sealed switch comprises a substrate, a lid body overlapping the substrate to be jointed integrally with each other, a switch case formed of the substrate and the lid body, a seal ring provided between overlapping surfaces of the substrate and the lid body to seal a space between the overlapping surfaces by flexible deformation of the seal ring, a movable board arranged in the switch case and rotatably arranged between the substrate and the lid body, movable contact points arranged on an opposing surface of the movable board to the substrate, fixed contact points provided on opposing portions of the substrate to the movable contact points to be electrically connected to/disconnected from the movable contact points with rotation of the movable board, a connecting piece portion formed integrally with the fixed contact point and extending inside the substrate by insert molding to the substrate to be exposed to an outside as a terminal of a connector portion in a side wall of the substrate, an upper shaft portion and a lower shaft portion provided in a shaft portion of the movable board to rotatably support the shaft portion of the movable board to the substrate and the lid body, shaft holes formed in the substrate and the lid body to rotatably support the upper shaft portion and the lower shaft portion through seal bearings respectively, and communicating openings provided in the substrate and the lid body to communicate the shaft holes with an outside, wherein at least one of the seal bearings includes a cylindrical body portion fitted in one of the shaft holes, and a lip-shaped seal portion provided in a lip shape on an inner peripheral surface of the body portion and making flexible contact with a rotary surface of the upper shaft portion or the lower shaft portion opposing the seal portion to seal an inside of the switch case, wherein the seal portion is flexibly separated from the rotary surface by a difference between a pressure in the communicating opening side reduced through the communicating opening and the shaft hole communicated with the communicating opening and a pressure in the switch case to form a discharging opening between the rotary surface and the seal portion for discharging an air in the switch case.

In the sealed switch according to the aspect of the present invention, since the pressure in the switch case can be reduced by discharging the air in the switch case, the leakage of the grease applied to the fixed contact point from the connector portion can be prevented. Therefore occurrence of the secondary harmful effect due to the leakage of the grease can be prevented to largely improve the reliability. In addition, since the substrate and the lid body are sealed by the seal ring, the entering of water components or dusts into the switch case can be prevented. Further, it is possible to manufacture the seal switch with easiness and at low costs, which leads to a reduction of costs as a whole.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 9A, FIG. 9B and FIG. 9C are explanatory diagrams each showing a state of verification for an internal pressure in the sealed switch in the pressure-reducing process according to the embodiment;

DESCRIPTION OF THE PREFERRED EMBODIMENT

Hereinafter, a sealed switch according to an embodiment in the present invention will be explained by taking a neutral start switch (inhibitor switch) mounted on a vehicle to be used for detection of a selection range of a shift lever, as an example.

Figure 1:
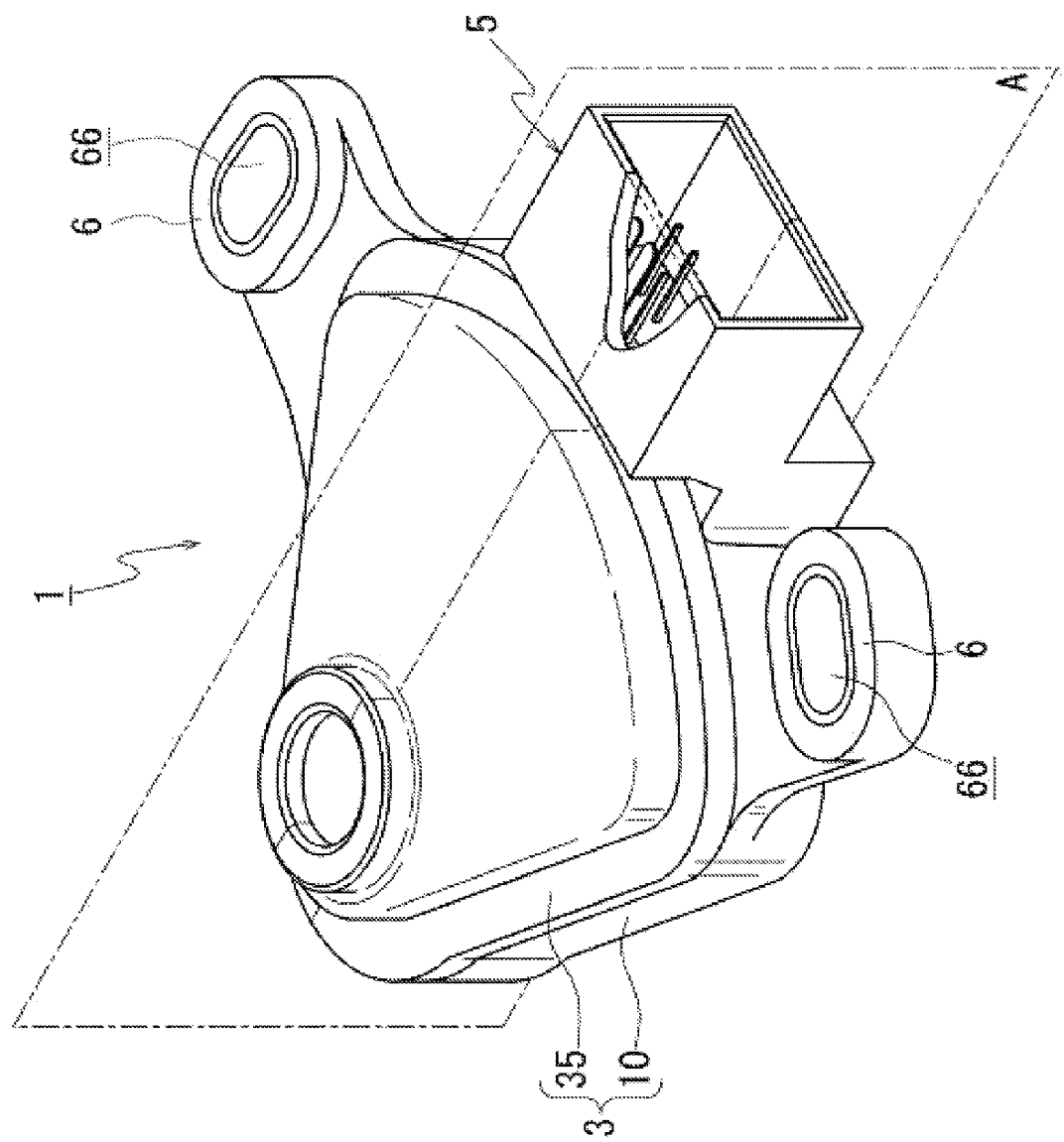
FIG. 1 is a perspective view showing an outside appearance of a neutral start switch according to an embodiment in the present invention.
Figure 2:
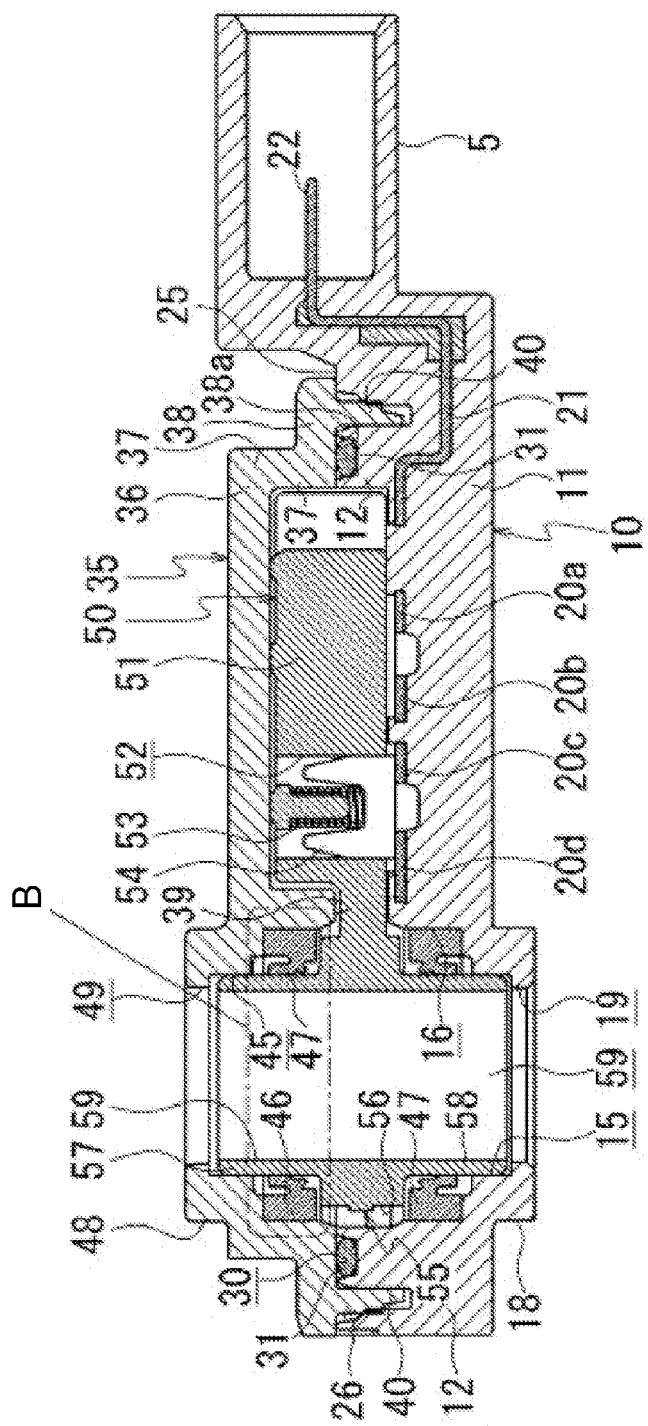
FIG. 2 is a cross section taken along an A plane in FIG. 1.
Figure 3:
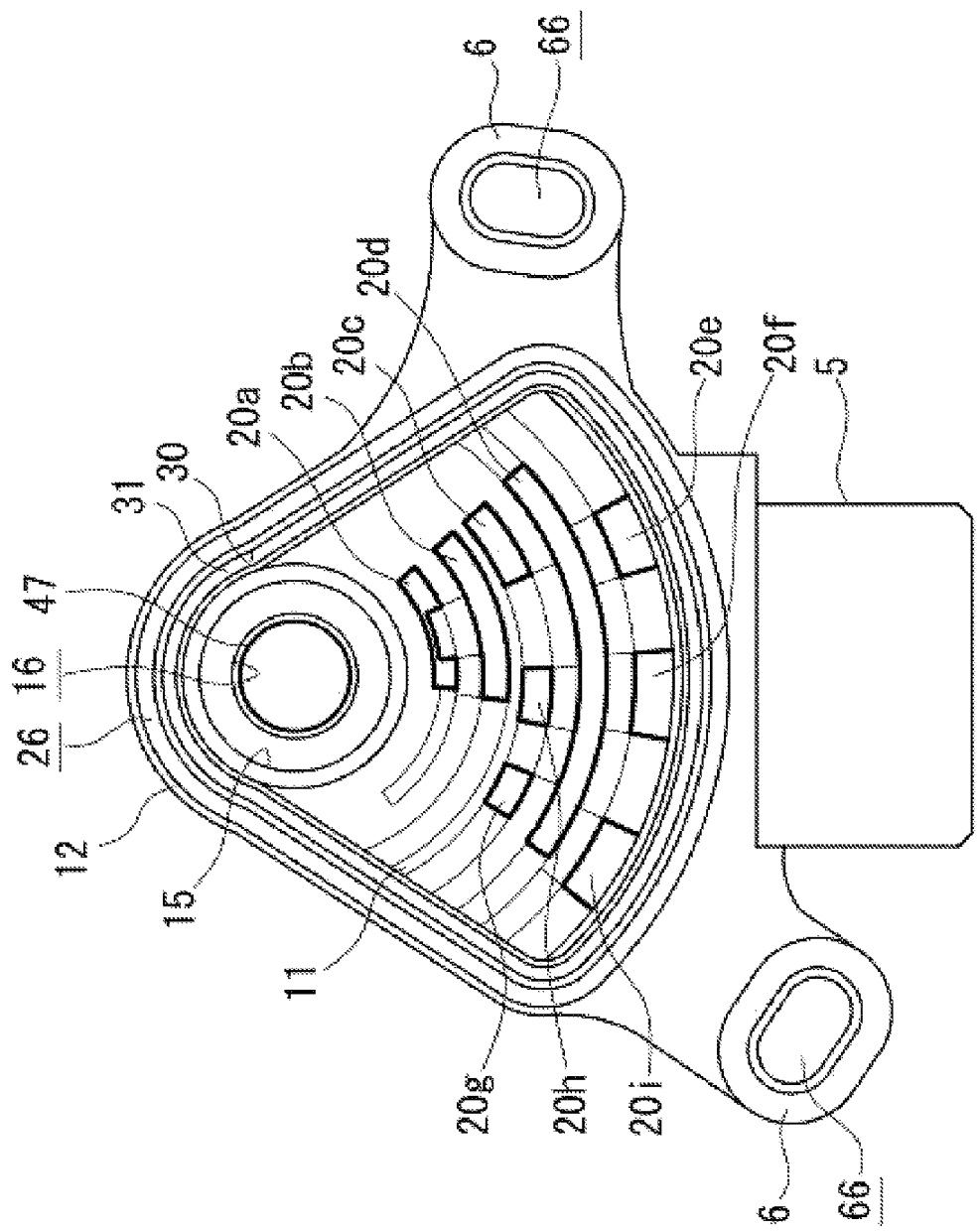
FIG. 3 is a plan view showing a substrate with a lid body being removed from the neutral start switch according to the embodiment.

FIG. 1 is a perspective view showing an outside appearance of a neutral start switch according to the embodiment. FIG. 2 is a cross section taken along an A plane in FIG. 1. FIG. 3 is a plan view showing a substrate as viewed from a lid body side.

By referring to FIG. 1 to FIG. 3, the neutral start switch 1 is provided with a switch case 3 formed of a plastic substrate 10 and a lid body 35, each being made of a non-conductive plastic material excellent in heat resistance properties. Fixed contact points 20 (20a to 20i) are arranged on the substrate 10 called a polar board, and a movable board 50 provided with movable contact points 54 is accommodated in the switch case 3. The substrate 10 comprises primarily a bottom wall 11 provided with the fixed contact points 20 (20a to 20i), a side wall 12 rising from a peripheral edge of the bottom wall 11, and further, a connector portion 5 extending outward of the side wall 12 from the bottom wall 11 and positioned outside of a region where the lid body 35 overlaps the side wall 12.

A shaft hole 15 for accommodating a shaft portion 55 of the movable board 50 is provided in the bottom wall 11 of the substrate 10 toward the outward from the inside, and a cylindrical seal receiving portion 16 enlarged in a diameter is provided in the inner end of the shaft hole 15 at the open side thereof. A ring-shaped seal bearing 47 is held in the seal receiving portion 16. The bottom wall 11 is formed in a fan shape on the basis of the shaft hole 15, and the fixed contact points 20 (20a to 20i) are insert-molded on a plurality of rows arcs around the shaft hole 15. Each fixed contact point 20 (20a to 20i), as shown in FIG. 2, integrally has a connecting piece portion 21 extending to the connector portion 5. The connecting piece portion 21 is embedded in the bottom wall 11 by insert molding, and a tip end of the connecting piece portion 21 forms part of a terminal 22 in the connector portion 5, which is exposed to an outside. It should be noted that, as shown in FIGS. 1 and 3, mount portions 6 are formed in the substrate 10 outside of a region where the lid body 35 overlaps the substrate 10 for mounting the neutral start switch 1 on an automatic transmission (not shown), and a metallic collar is embedded in each of the mount portions 6 and is provided with a long hole 66 for mounting the automatic transmission (not shown).

Figure 5:
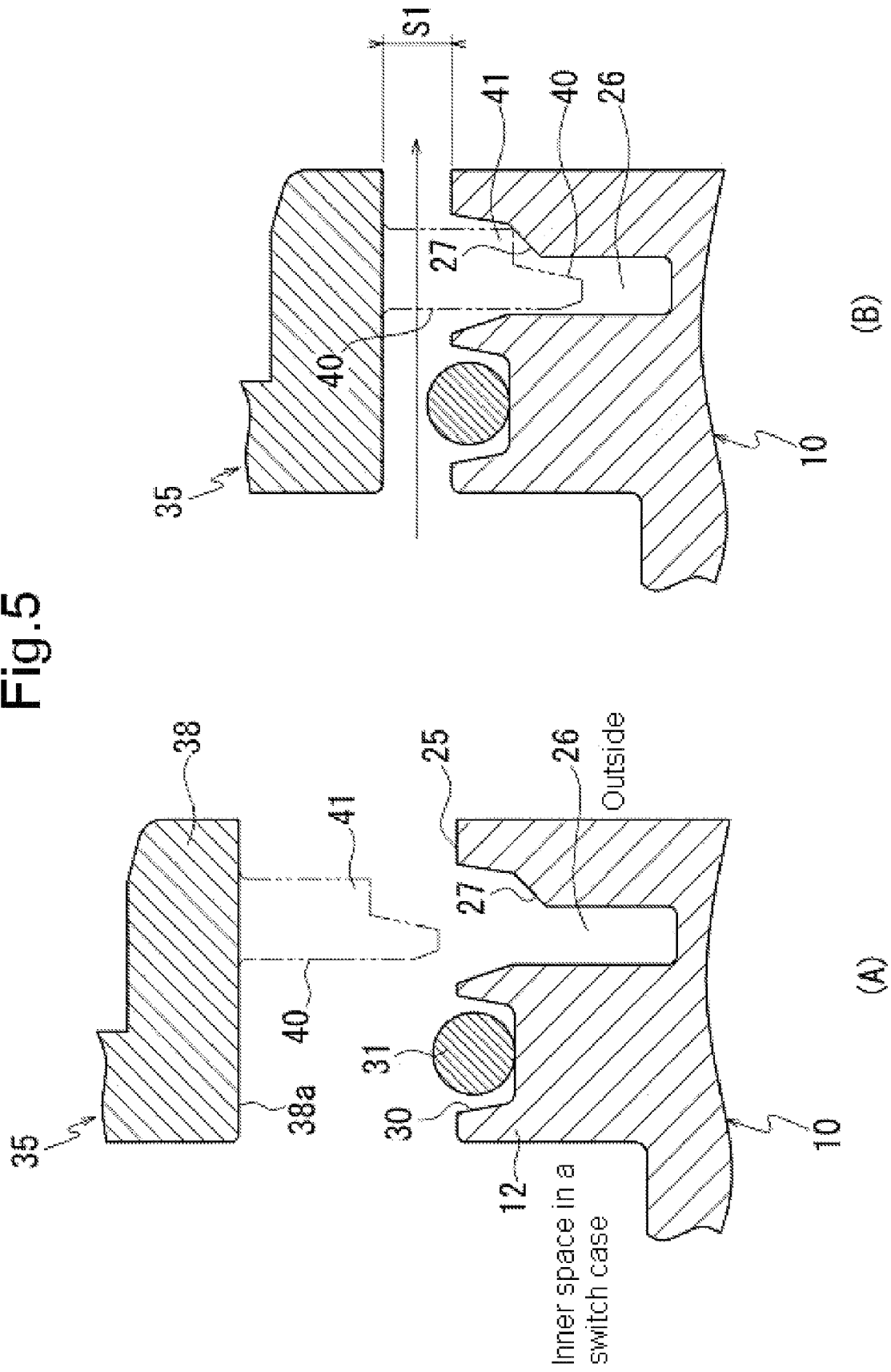
FIG. 5A and FIG. 5B are cross sections each showing a detailed key part of a welding structure (joint structure) of the substrate and the lid body applied to the welding of the neutral start switch according to the embodiment.

The lid body 35 is formed in a fan shape corresponding to the bottom wall 11 of the substrate 10, and has a flange portion 38 opposing a top end surface 25 of the side wall 12 in the substrate 10 at the lower edge of a side wall 37 surrounding the peripheral edge of an upper wall 36. The flange portion 38 has a lower surface 38a which serves as a seal surface making contact with a seal ring 31, which will be described later, arranged on the top end surface 25 to seal the switch case 3, and is provided with a projecting streak portion 40 formed to correspond to a concave streak portion 26 (refer to FIG. 5), which will be described later, of the substrate 10. A welding shoulder portion 41 (refer to FIG. 5) is formed in the intermediate portion in the height direction of the projecting streak portion 40 at the outer peripheral side thereof.

The upper wall 36 of the lid body 35 is provided with a shaft hole 45 to correspond to the shaft hole 15 of the bottom wall 11, and the shaft hole 45 is provided from the inside to the outward to accommodate the shaft portion 55 of the movable board 50. A seal receiving portion 46 enlarged in a diameter is provided in the inner end of the shaft hole 45 at the opening side thereof. A ring-shaped seal bearing 47 (described later) is retained in the seal receiving portion 46.

A boss portion 18 is formed on an outer surface of the bottom wall 11 in the substrate 10 to correspond to the shaft hole 15, and a boss portion 48 is formed also on an outer surface of the upper wall 36 in the lid body 35 to correspond to the shaft hole 45. The shaft hole 15 does not extend to an outer end of the boss portion 18, and a hole 19 is formed in the boss portion 18 to be coaxial with the shaft hole 15. The hole 19 has a diameter slightly smaller than that of the shaft hole 15, and larger than that of a through hole 59, which will be described later, of the shaft portion 55. That is, the through hole 59 is opened through the hole 19 to an outside. Similarly the shaft hole 45 does not extend to an outer end of the boss portion 48, and a hole 49 is formed in the boss portion 48 to be coaxial with the shaft hole 45. The hole 49 has a diameter slightly smaller than that of the shaft hole 45, and larger than that of the through hole 59.

The movable board 50 comprises a contact point support portion 51 for supporting the movable contact point 54, and a movable board shaft portion (hereinafter called shaft portion) 55 integral with the contact point support portion 51. The shaft portion 55 comprises a step portion 56 enlarged in a diameter, an upper shaft portion 57 extending upwards and a lower shaft portion 58 extending downwards to interpose the step portion 56 therebetween, wherein the contact point support portion 51 radially extends from the step portion 56. The shaft portion 55 is provided with the through hole 59 penetrating from the upper shaft portion 57 to the lower shaft portion 58. The shaft portion 55 is jointed to an arm (not shown) for rotating the movable board 50 in response to an operation of a shift lever (not shown). Therefore when the movable board 50 rotates in response to the operation of the shift lever, the fixed contact point 20 (20a to 20i) making contact with the movable contact point 54 is switched corresponding to a rotation position of the movable board 50.

A projecting portion 39 is formed on the inner surface of the upper wall 36, which projects by a predetermined amount from a predetermined range corresponding to the seal receiving portion 46 around the shaft hole 45. The upper shaft portion 57 and the lower shaft portion 58 of the shaft portion 55 extend on the same axial line, and are supported by the shaft hole 45 of the lid body 35 and the shaft hole 15 of the substrate 10, and the contact point support portion 51 is rotatable on a basis of the shaft portion 55 in the switch case 3. The contact point support portion 51 is provided with movable contact point retaining holes 52 opened to face the bottom wall 11 of the substrate 10, and the movable contact point 54 accommodated in the movable contact point retaining hole 52 is provided to be urged against the fixed contact point 20 (20a to 20i) on the bottom wall 11 by a spring 53. It should be noted that a plurality of movable contact points 54 corresponding to a plurality of rows of the fixed contact points 20 (20a to 20i) are supported by the contact point support portion 51, but for simplification, only the single movable contact point 54 is illustrated in FIG. 2. The upper surface of the contact point support portion 51 is positioned to be slidable with the inner surface of the upper wall 36 at a radial outside of the projecting portion 39 in the lid body 35.

As described above, since the hole 19 opened to the boss portion 18 of the substrate 10 is smaller in a diameter than the shaft hole 15 and the hole 49 opened to the boss portion 48 of the lid body 35 is also smaller in a diameter than the shaft hole 45, a rotary surface of the shaft portion 55 (upper shaft portion 57 and lower shaft portion 58) and an inner peripheral surface of each of the shaft holes 15 and 45 are hidden from an outside to prevent dusts or water from directly entering therebetween. Further, in the respective shaft holes 15 and 45, a seal structure to the upper shaft portion 57 and the lower shaft portion 58 of the shaft portion 55 is formed by the seal bearings 47 retained in the seal receiving portions 16 and 46. Therefore this seal structure can certainly block out the entering of dusts or the like into the switch case 3 from the rotary surface between the shaft portion 55 and each of the shaft holes 45 and 15.

FIG. 4A and FIG. 4B are enlarged diagrams each showing a key part in FIG. 2 showing the seal bearings 47. FIG. 4A shows a state where the seal bearing 47 is closed, and FIG. 4B shows a state where the seal bearing 47 is opened. The seal bearing 47 is made of a rubber material high in heat resistance properties and high in weather resistance properties. As shown in FIG. 2, FIGS. 4A and 4B, and FIG. 13, the seal bearing 47 comprises a cylindrical body portion 47a fitted in each of the shaft holes 45 and 15, the upper shaft portion 57 and each of the upper shaft portion 57 and the lower shaft portion 58, a lip-shaped seal portion 47b of a first stage (main seal portion) extending from an inner peripheral surface of the body portion 47a to a rotary surface side of each of the upper shaft portion 57 and the lower shaft portion 58 to make flexible contact across an entire circumference with the rotary surface as an opposing surface of each of the upper shaft portion 57 and the lower shaft portion 58 for sealing, and a lip-shaped sub seal portion 47c of a second stage formed to be separated by an appropriate interval from the first seal portion 47b.

The seal portion 47b is configured such that at least a tip end portion thereof regularly makes flexible contact with the rotary surface of the shaft portion 55 across an entire circumference to seal the rotary surface, and at the pressure-reducing time of the shaft hole 45, as shown in FIG. 4B, the seal portion 47b is separated from the rotary surface of the upper shaft portion 57 due to a difference in pressure from the inside of the switch case 3 to form a discharging opening 47d of an air in the switch case 3 between the rotary surface and the seal portion 47b. Therefore a base end portion of the seal portion 47b is arranged on the inner peripheral surface of the body portion 47a at the switch case side, and the tip end portion of the seal portion 47b is arranged at the side of the shaft hole 45 on the inner peripheral surface of the body portion 47a.

The seal portion 47b according to the present embodiment is formed to be inclined to an axis center line direction of the body portion 47a. In addition, the seal portion 47b is formed across an entire circumference of the inner peripheral surface of the body portion 47a as a one-way valve (diaphragm valve) opened by a difference in pressure, and is turned up by a difference in pressure at the pressure-reducing time of the switch case 3 by the pressure reduction of the neighboring shaft hole, for example, the shaft hole 45 or a suction force at the pressure-reducing to form the discharging opening 47d.

A concave portion 47e is formed between the body portion 47a and the seal portion 47b. The concave portion 47e is provided across an entire circumference between the backside of the seal portion 47b and the inner peripheral surface of the body portion 47a to promote the flexible deflection of the seal portion 47b for facilitating formation of the discharging opening 47d, at the pressure-reducing of the shaft hole 45 due to a discharge through the shaft holes 45 and 15. In addition, the body portion 47a is provided with a sub seal portion 47c formed closer to the inside of the switch case 3 than the seal portion 47b of the first stage. For configuring a labyrinth seal structure together with the seal portion 47b of the first stage, the sub seal portion 47c is provided to have an interval from the seal portion 47b, and is inclined in a direction opposite to a direction of the seal portion 47b to the inner peripheral surface of the body portion 47a.

In an example shown in FIG. 4A, the sub seal portion 47c, at least a tip end thereof is formed in a lip shape to regularly make flexible contact with the rotary surface of the upper shaft portion 57 or the lower shaft portion 58, and the sub seal portion 47c is provided with a communicating opening 81 formed of a hole or a notch for passing the air in the switch case 3 to the side of the seal portion 47b. As the communicating opening 81 is formed in the sub seal portion 47c, at the pressure-reducing of the switch case 3 a labyrinth seal structure comprising sequentially the communicating opening 81, a space between the sub seal portion 47c and the seal portion 47b and the discharging opening 47d is formed for suppressing sudden blowout at the pressure-reducing.

Next, an explanation will be made of the welding (fusion welding) structure between the substrate 10 and the lid body 35. The welding is performed by vibration welding or ultrasonic welding using ultrasonic vibration energy. In the present embodiment, an explanation will be made of a case of welding by a share joint method.

Figure 12:
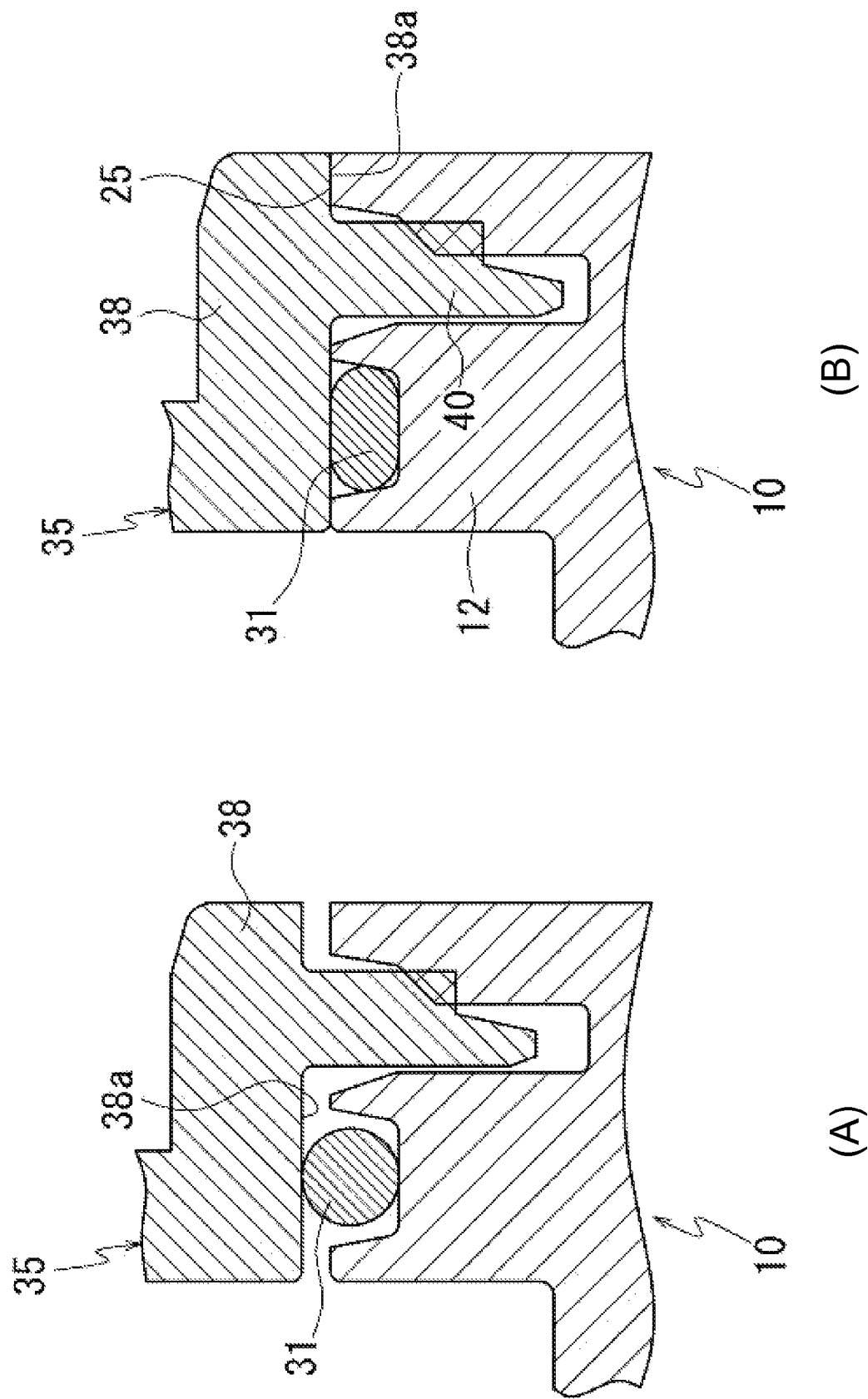
FIG. 12A and FIG. 12B are cross sections each showing the detailed key part of the welding structure (joint structure) of the substrate and the lid body applied to the welding of the conventional neutral start switch.
Figure 13:
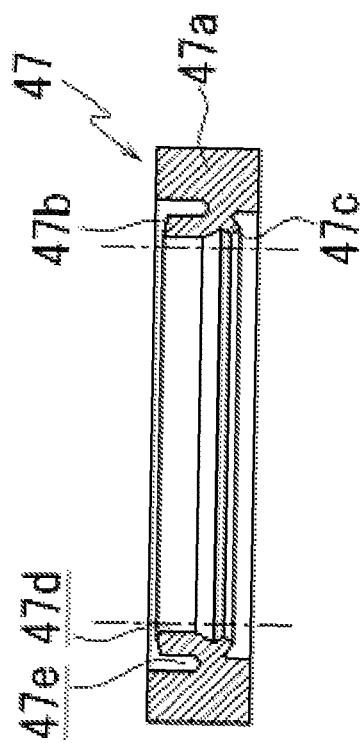
FIG. 13 is a diagram showing a portion of the switch corresponding to a region B in FIG. 2.

FIGS. 5A and 5B, and FIGS. 6A and 6B are enlarged cross sections showing a joint portion between the substrate 10 and the lid body 35, and the welding process thereof. The side wall 12 of the substrate 10 surrounds the entire circumference of the bottom wall 11 for closure, and the concave streak portion 26 is formed across the entire circumference of the side wall 12 on the top end surface 25. In addition, the projecting streak portion 40 of the lid body 35 is provided on the lower surface as an overlap surface to the top end surface 25 of the side wall 12. The projecting streak portion 40 substantially surrounds the entire circumference of the lid body 35, and is fitted into the concave streak portion 26 of the side wall 12, wherein the projecting streak portion 40 and the side wall 12 are jointed by high-frequency welding to form the switch case 3 with the substrate 10 and the lid body 35 integral with each other. The welding portion between the lid body 35 and the substrate 10 is the same as the structure shown in FIG. 12B.

Prior to the welding between the lid body 35 and the substrate 10, as shown in FIG. 5A the side wall 12 of the substrate 10 surrounds the entire circumference of the bottom wall 11 for closure, and a ring groove 30 for accommodating the seal ring 31 and the concave streak portion 26 are formed across the entire circumference in order from the inside on the top end surface (overlap surface) 25 of the side wall 12. A welding inclination surface 27 is formed in the depth portion of the concave streak portion 26 of the side wall 12 at the outer peripheral side.

When the projecting streak portion 40 of the lid body 35 is inserted into the concave streak portion 26 of the substrate 10, first, as shown in FIG. 5B a corner of the welding shoulder portion 41 in the projecting streak portion 40 makes contact with the welding inclination surface 27 of the concave streak portion 26 on the general section. Thereafter, as the lid body 35 is further pressed to the substrate 10, the interference portion between the welding shoulder portion 41 and the welding inclination surface 27 on the general section is welded to reduce a volume of the inner space formed between the lid body 35 and the substrate 10. Even in that case, since air in the inner space escapes to an outside as shown in an arrow, the pressure therein does not increase.

Figure 6:
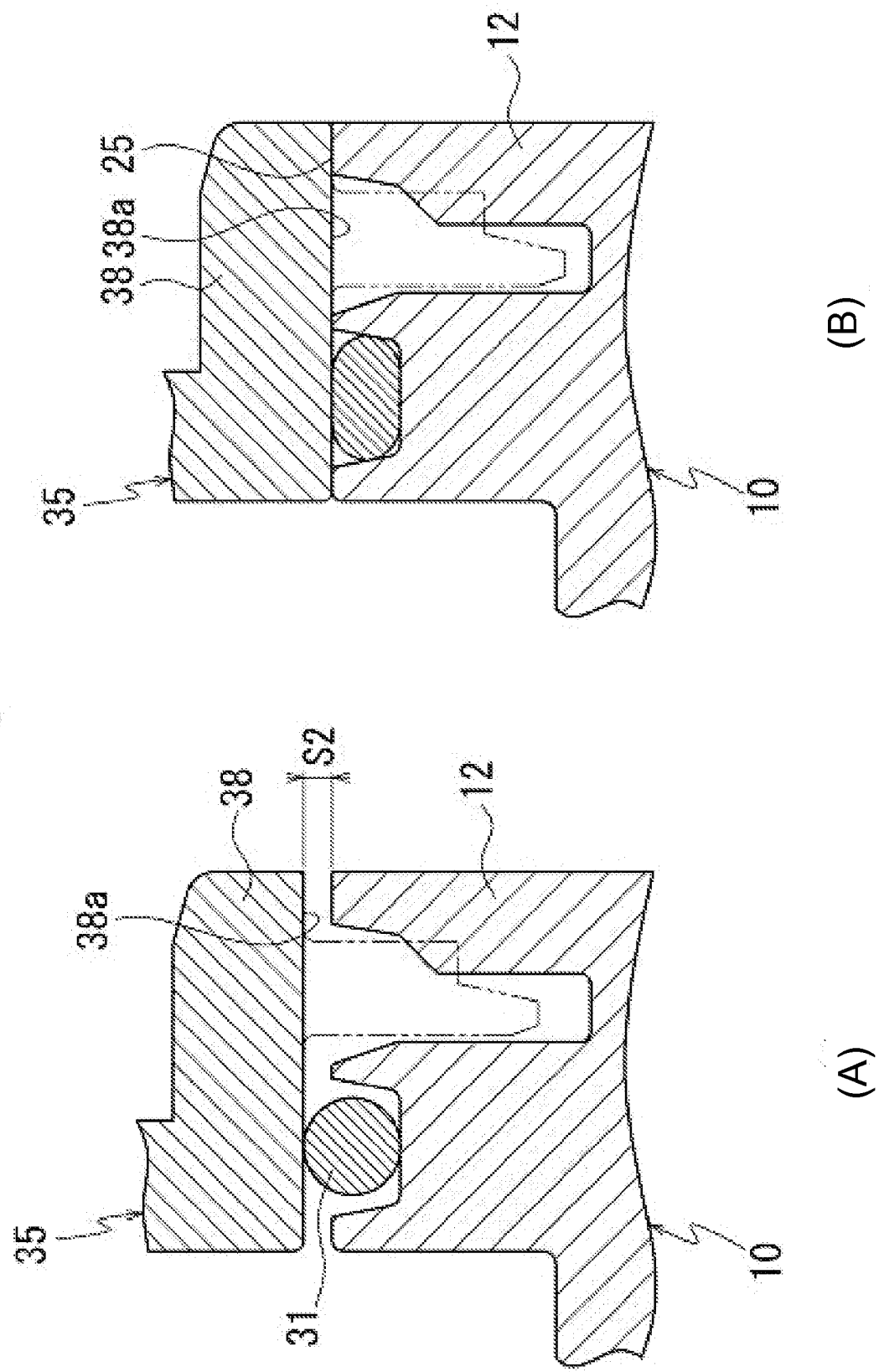
FIG. 6A and FIG. 6B are cross sections each showing the detailed key part of the welding structure (joint structure) of the substrate and the lid body applied to the welding of the neutral start switch according to the embodiment.

As shown in FIG. 6A, as the lower surface 38a of the flange portion 38 makes contact with the seal ring 31 in the seal groove 30, the inner space formed between the lid body 35 and the substrate 10 is eventually blocked out from the outside by the seal ring 31. After that, as the lid body 35 is further pressed to the substrate 10, as shown in FIG. 6B finally, the lower surface 38a of the flange portion 38 is seated on the top end surface 25 of the side wall 12. Thereby the projecting streak portion 40 and the side wall 12 are welded substantially across the peripheral edge to be certainly jointed, and the seal ring 31 is interposed in a compressed state between the lid body 35 and the substrate 10. As a result, the inside of the switch case 3 is in a sealing state to an outside.

Next, a pressure-reducing method and an air-tight inspection method after the pressure-reducing will be explained as a manufacturing method of the neutral start switch 1 according to the present embodiment.

(Pressure-reducing Device)

Figure 7:
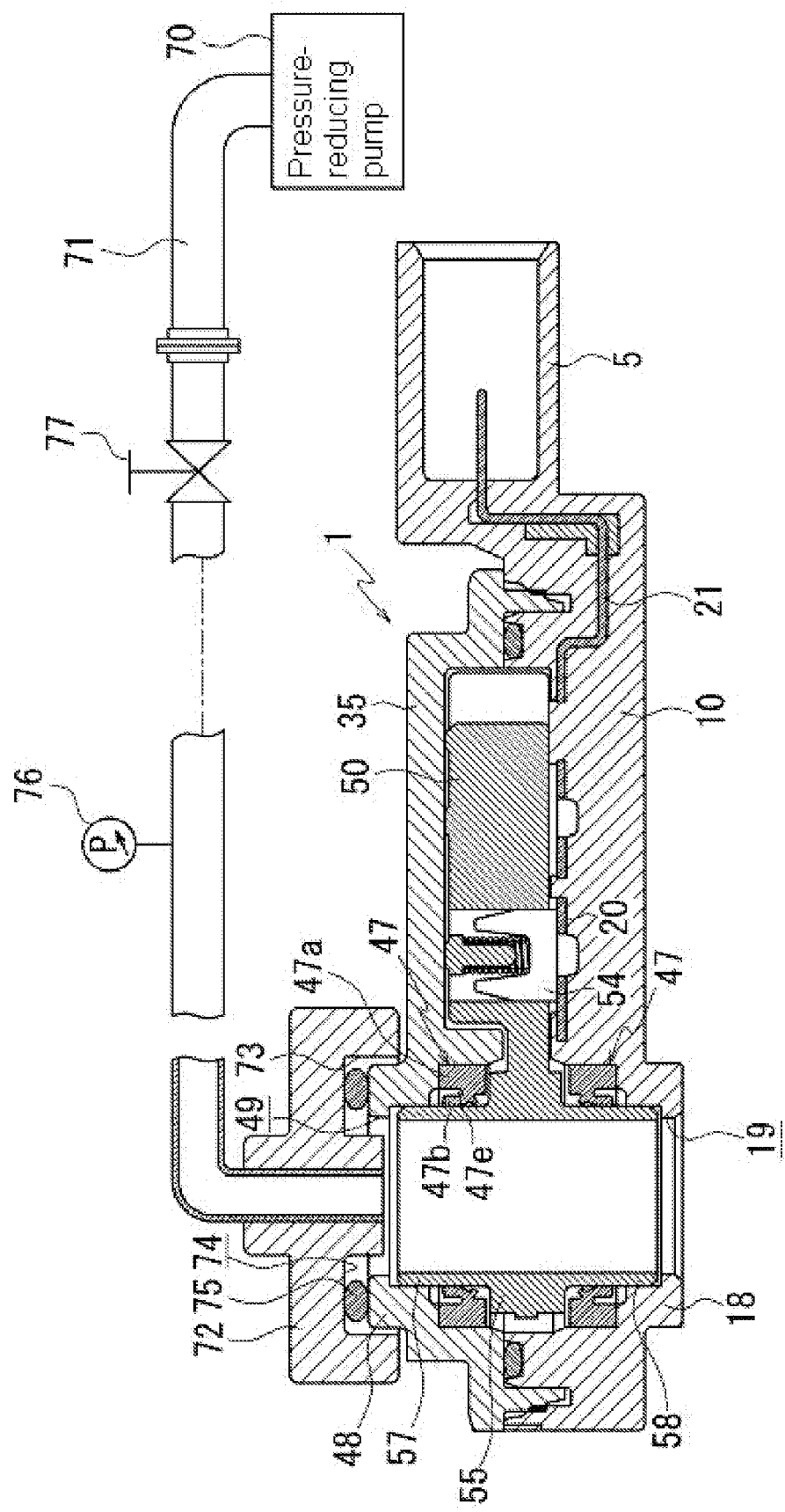
FIG. 7 is a configuration diagram showing a pressure-reducing device for reducing a pressure in a switch case according to the embodiment.

FIG. 7 is a configuration diagram showing a connecting state between a pressure-reducing device for reducing a pressure in the switch case of the neutral start switch 1 and the neutral start switch 1 according to the present embodiment. As shown in FIG. 7, at the time of reducing the pressure in the neutral start switch 1, for example, at the pre-process of the shipment, a coupler 72 is fitted in a spigot joint manner in either one of the holes 19 and 49 as communicating openings of the neutral start switch 1. The coupler 72 is mounted to one end portion of a resisting pressure pipe, and the other of the pressure pipe is jointed to the pressure-reducing device.

The pressure-reducing device comprises a pressure-reducing pump 70, such as a vacuum pump capable of reducing pressures, and a pressure-reducing line (for example, an exhaust pipe) 71 composed of the resisting pressure pipe, and the pressure-reducing pump 70 is connected to the downstream side of the pressure-reducing line 71. The coupler 72 comprises a fitting portion 73 fitted in the boss portion 48 or 18 of the neutral start switch 1 in a spigot joint manner, and a seal ring 75 mounted to the fitting portion 73, wherein the coupler 72 is configured to be sealed by flexible deformation of the seal ring 75 provided between a seating surface of the boss portion 48 or 18 and a seating surface of the coupler 72.

The pressure-reducing line 71 is provided with a pressure gauge 76 interposed therein, such as a Pirani gauge upstream of the cutoff valve 77 for measuring the pressure in the switch case 3 through the pressure-reducing line 71. The seating surface of the boss portion 48 or 18 on which the coupler 72 is seated through the seal ring 75 is formed as a mirror surface having a surface roughness of Rz 6.3 (μm) or less by JIS standards by mirror finish for establishing air-tight properties between the seating surface and the seal ring 75 seated on the seating surface. It should be noted that a pressure control valve may be provided in the pressure-reducing line 71 whereby, when a pressure in the switch case 3 is reduced to a pressure equal to or less than an atmospheric pressure, the cutoff valve 77 is closed to operate a notifying device for notifying it of an operator, thus realizing the automation.

(Pressure-reducing Process)

Figure 8:
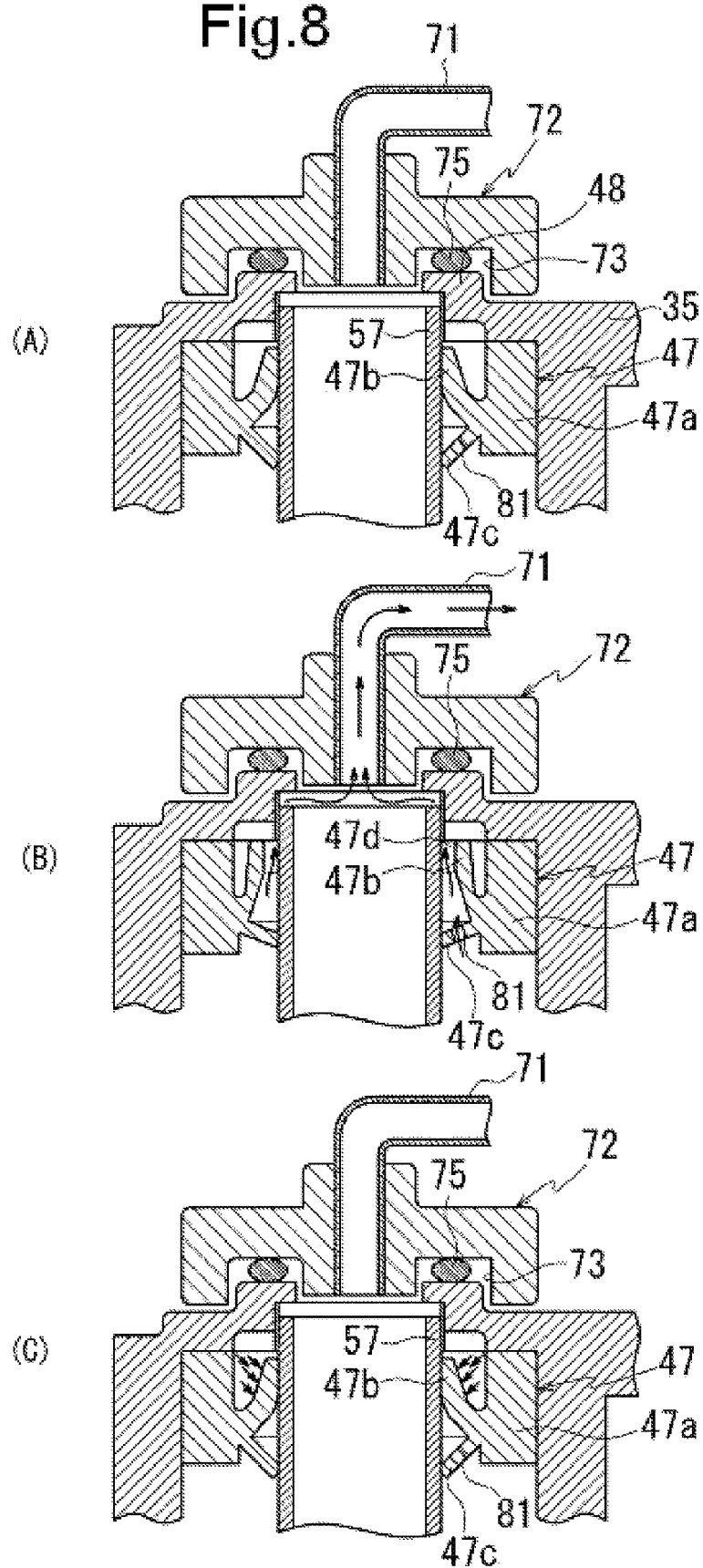
FIG. 8A, FIG. 8B and FIG. 8C are explanatory diagrams respectively showing a state before reducing the pressure, a state of reducing the pressure and a state after reducing the pressure in the switch case according to the embodiment.
Figure 10:
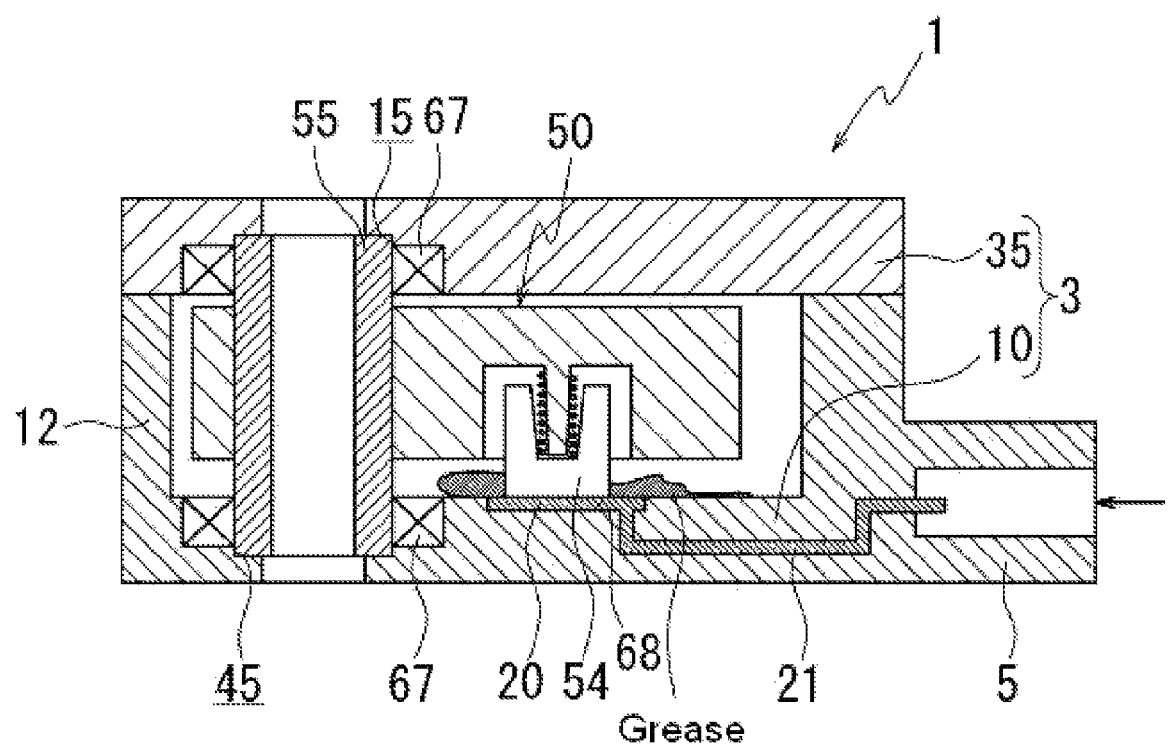
FIG. 10 is a cross section showing a typical configuration of a conventional neutral start switch.
Figure 11:
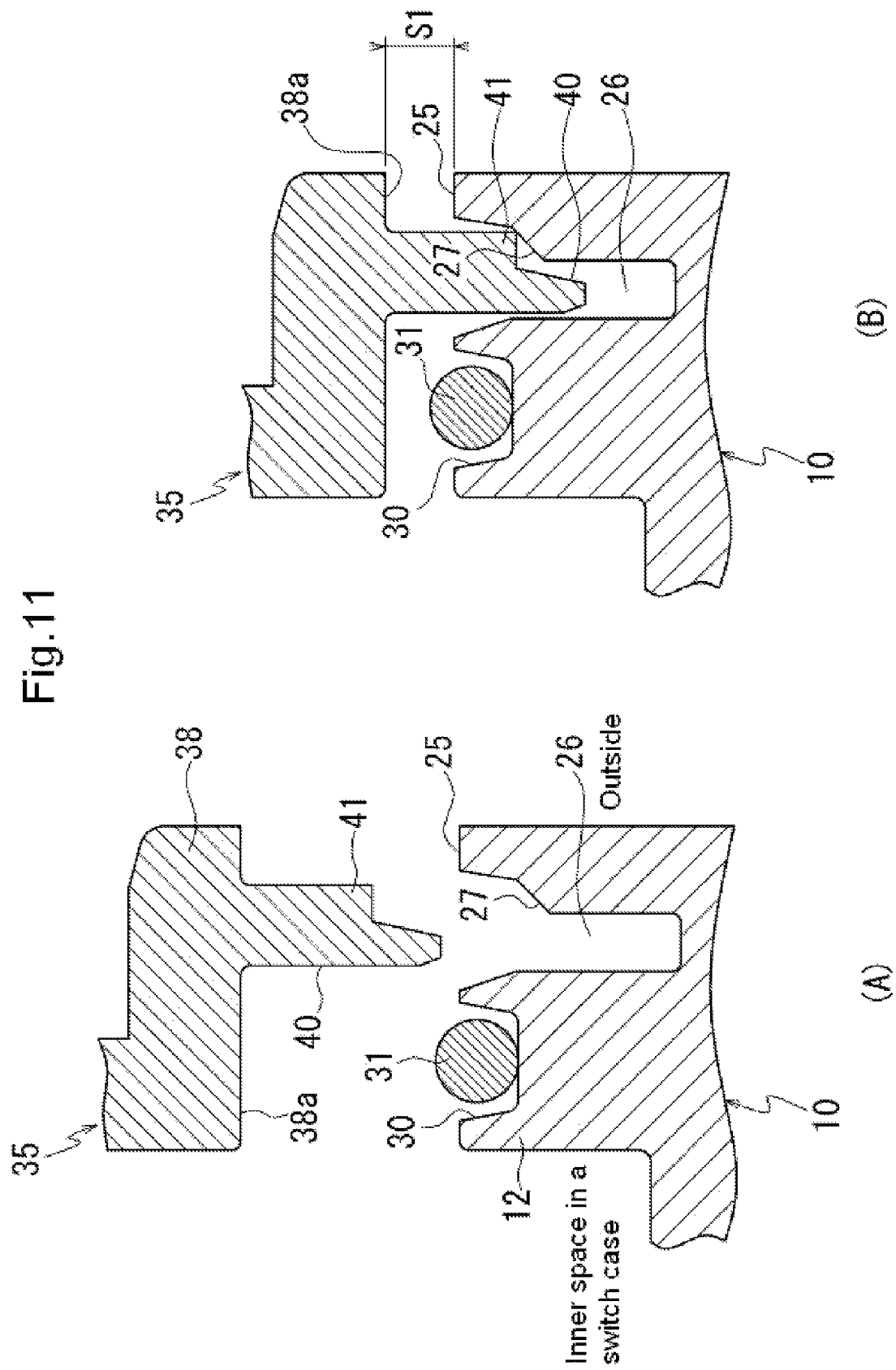
FIG. 11A and FIG. 11B are cross sections each showing a detailed key part of a welding structure (joint structure) of a substrate and a lid body applied to the welding of the conventional neutral start switch.

FIGS. 8A to 8C show the pressure-reducing process. FIG. 8A shows a state of the mount finish of the pressure-reducing device. FIG. 8B shows the pressure-reducing state of the pressure-reducing device. FIG. 8C shows the finish state of the pressure-reducing process. In the pressure-reducing process of the neutral star switch 1, as shown in FIG. 7 and FIG. 8A, the fitting portion 73 of the coupler 72 is fitted in either one of the boss portions 48 and the 18 in a spigot joint manner. At an initial period of the pressure-reducing process, the air-tight properties are maintained with the flexible deformation of the seal ring 75 by pressing the seal ring 75 against the seating surface of the boss portion 48 or 18. In addition, the cutoff valve 77 is opened while maintaining this state to discharge the air in the switch case 3 from the switch case 3, thus reducing the pressure in the switch case 3 to a predetermined pressure which can suppress the leakage of the grease, for example, a pressure of −100 (KPa).

In the pressure-reducing process, the pressure-reducing pump 70 is activated by a start switch (not shown) and the cutoff valve 77 is operated to open manually or by an operating signal from a meter relay (not shown) of a pressure meter or a controller (not shown). As described before, since the seating surface of the boss portion 48 is formed as the mirror surface and the surface of the seal ring 75 is made smooth, in a state where the coupler 72 is pressed through the seal ring 75 on the seating surface of the boss portion 48, there is no gap between the seating surface of the boss portion 48 and the seating surface of the coupler 72, and the seal ring 75. Therefore there is no possibility that outside air is suctioned from an outside. When the pressure-reducing pump 70 discharges the air in the hole 49, the shaft hole 45, the coupler 72 and the pressure-reducing line 71 to reduce the pressure therein, the seal ring 75 makes tight contact with the seating surface of the boss portion 48 and the seating surface of the coupler 72 makes tight contact with the seal ring 75. As a result, the coupler 72 is made to stick to the boss portion 48 through the seal ring 75. In this state the sealing state is maintained even if an operator releases its hands from the coupler 72. By the discharging operation of the pressure-reducing pump 70, a reduction in the pressure of each of the pressure-reducing line 71, the hole (communicating opening) 49 of the boss portion 48 and the shaft hole 45 is progressed, and a negative pressure exceeding the flexibility returning force of the seal portion 47b acts on the backside of the seal portion 47b through each of the pressure-reducing line 71, the hole (communicating opening) 49 of the boss portion 48 and the shaft hole 45. Then the seal portion (main seal portion) 47b is opened to form the discharging opening 47d discharging the air in the switch case 3 between the rotary surface of the upper shaft portion 57 and the tip end portion of the seal portion 47b.

When the discharging opening 47d is formed, the air in the switch case 3 reaches through the communicating opening 81 (refer to FIG. 4) formed of the hole or the notch in the sub seal portion 47c, the shaft hole 45, the hole 49 of the boss portion 48 and the pressure-reducing line 71 to the suction portion of the pressure-reducing pump 70, and is discharged to an atmosphere from the discharging port (not shown) of the pressure-reducing pump 70. Therefore the pressure in the switch case 3 is gradually reduced. When the pressure in the switch case 3 is reduced for the detection pressure of the pressure meter 76 to reach a predetermined pressure equal to or less than the atmospheric pressure, for example, a pressure of –100 (KPa), the cutoff valve 77 is closed manually or automatically by the control of the controller (not shown) based upon a detection value of the meter relay in the pressure meter 76 or of a pressure sensor (not shown). In this state, as shown in FIG. 8C, the seal portion 47b makes tight contact with the rotary surface of the upper shaft portion 57 by a difference between the atmospheric pressure and the pressure in the switch case 3 and by the flexible force of the seal portion 47b itself to seal the switch case 3. in a state where the pressure in the switch case 3 is equal to or less than the atmospheric pressure, the movement of the grease, which is about to leak through the boundary between the connecting piece portion 21 and the plastic (plastic of the substrate 10) from the connector portion 5, to the side of the connector portion 5 is stopped and in reverse, the grease returns to the inside of the switch case 3 by the difference in the pressure. Therefore the leakage of the grease from the connector portion 5 is prevented to eliminate the secondary harmful effects due to the leakage of the grease. That is, the erroneous recognition that water enters in the switch case 3 and the grease starts to leak, a reduction in durability and short cut of the fixed contact point 20 due to the leakage of the grease, and degradation in an outside appearance of the switch case 3 due to dusts adhering to the leaked grease are eliminated to improve the function and reliability of the outside appearance as a finished product.

(Inspection Process of Air-tight Properties)

The air-tight inspection is implemented as the inspection process before shipment of a finished product, which is a process in the downstream side of the manufacturing process.

FIG. 9A, FIG. 9B and FIG. 9C are diagrams showing verification of an internal pressure in the switch case in the pressure-reducing process, wherein FIG. 9A shows a state of an internal pressure immediately after the assembly, and FIG. 9B shows a state of an internal pressure after the pressure-reducing. FIG. 9C shows an example of an inspection method of confirming the pressure-reducing effect.

The inspection device is, as shown in FIG. 9C, configured by a plug 78 connected to the connector portion 5 and a pressure meter 80 for detecting a pressure between the plug 78 and the connector portion 5. In the verification process of a pressure in the neutral start switch 1, when the pressure between the plug 78 and the connector portion 5 is equal to or less than an atmospheric pressure, it is determined that the neutral start switch 1 can be shipped as a finished product. The determination may be made by reading the pressure meter 76 by a responsible person of inspection, but in the present embodiment, when the meter relay (not shown) of the pressure meter 80 becomes a set value, for example, when the pressure of the aforementioned pressure-reducing process becomes a predetermined pressure which can suppress the leakage of the grease, for example, a pressure value equal to or less than an atmospheric pressure, the meter relay sends a signal that the verification result is normal, to the controller (not shown), which outputs the inspection result to a display device. In the present embodiment, when the pressure in the switch case 3 reaches the set value (for example, –100 KPa) equal to or less than an atmospheric pressure, the meter relay is operated and sends, as a signal, information that the pressure in the switch case 3 is below the atmospheric pressure to the controller.

The controller, when this signal is outputted, that is, when the pressure in the switch case 3 reaches the set value equal to or less than the atmospheric pressure, sends a signal that the verification result is normal (acceptable) to the display device, for example, a signal lamp, a display or a notifying device. When the verification result is normal (acceptable), as shown in FIG. 9B the grease is pulled back to the inside of the switch case 3 and the leakage of the grease from the connector portion 5 is prevented. In a case where the display device is a signal lamp showing blue and red colors, the controller turns on, for example, the signal lamp in blue. In a case where the display device is the notifying device, the controller selects, for example, a chime sound as a signal corresponding to the inspection acceptance, which is outputted to the notifying device. In a case where the display device is the display, the controller displays a display of the inspection acceptance on the display. In a case where a signal corresponding to the inspection acceptance is not outputted from the meter relay even after a predetermined time elapses, the controller outputs a signal of the inspection failure to the display device. In a case where the display device is the lamp device, the controller turns on the lamp device in red. In a case where the display device is the notifying device, the controller selects a buzzer sound for outputting. In a case where the display device is the display, the controller displays the display of the inspection failure.

As described above, the neutral start switch 1 according to the embodiment in the present invention comprises the substrate 10, the lid body 35 overlapping the substrate 10 to be jointed integrally with each other, the switch case 3 formed of the substrate 10 and the lid body 35, the seal ring 31 interposed between the overlapping surfaces of the substrate 10 and the lid body 35 to seal the space between the overlapping surfaces by flexible deformation of the seal ring 31, the movable board 50 arranged in the switch case 3 and rotatably arranged between the substrate 10 and the lid body 35, the movable contact points 54 arranged on the opposing surface of the movable board 50 to the substrate 10, the fixed contact points 20 provided on the opposing portions of the substrate 10 to the movable contact points 54 to be electrically connected to/disconnected from the movable contact points 54 with rotation of the movable board 50, the connecting piece portion 21 formed integrally with the fixed contact point 20 and extending inside the substrate 10 through insert molding to the substrate 10 to be exposed to an outside as the terminal of the connector portion 5 in the side wall 12 of the substrate 10, the upper shaft portion 57 and the lower shaft portion 58 provided in the base portion (shaft portion 55) of the movable board 50 to rotatably support the movable board 50 to the substrate 10 and the lid body 35, the shaft holes 45 and 15 formed in the substrate 10 and the lid body 35 to rotatably support the upper shaft portion 57 and the lower shaft portion 58 through the seal bearings 47 respectively, and the communicating openings (holes 19 and 49) provided in the substrate 10 and the lid body 35 to communicate the shaft holes 45 and 15 with an outside, wherein at least one of the seal bearings 45 and 15 includes the cylindrical body portion 47a fitted in one of the shaft holes 45 and 15, and the lip-shaped seal portion 47b provided in a lip-shaped manner on the inner peripheral surface of the body portion 47a and making flexible contact with the rotary surface of the upper shaft portion 57 or the lower shaft portion 58 opposing the seal portion 47b to seal the inside of the switch case 3, wherein the seal portion 47b is flexibly separated from the rotary surface by a difference between a pressure in the communicating opening (hole 49 or 19) side reduced through the communicating opening (hole 49 or 19) and the shaft hole (45 or 15) communicated with the communicating opening (hole 49 or 19) and a pressure in the switch case 3 to form the discharging opening 47d between the rotary surface and the seal portion 47b for discharging the air in the switch case 3. According to the neutral start switch 1, since the pressure in the switch case 3 can be reduced to a pressure equal to or less than a predetermined pressure through the discharging opening 47d, the phenomenon that the grease is pushed out along the connecting piece portion 21 to the connector portion 5 is prevented, therefore preventing occurrence of the secondary harmful effect.

In the sealed switch, the concave portion 47e is provided between the backside of the seal portion 47b and the body portion 47a for promoting a flexible deflection of the seal portion 47b. Therefore the seal portion 47b is opened by a difference between the negative pressure acting on the seal portion 47b through shaft hole 45 or 15 and the pressure in the switch case 3 to certainly form the discharging opening 47d. Therefore the sealed switch has high reliability. The concave portion 47e is preferably provided across the entire circumference.

In the sealed switch, at least one sub seal portion 47c is provided in the body portion 47a at the side of the switch case 3, which forms a labyrinth-shaped seal regularly making flexible contact with the rotary surface and cooperating with the seal portion 47b, and the communicating opening 18 formed of the hole or the notch is formed in the sub seal portion 47c for passing the air in the switch case 3 into the side of the seal portion (main seal portion) 47b closer to the shaft hole. Here, "passing the air in the switch case 3 into the side of the seal portion (main seal portion) 47b closer to the shaft hole" means "when the discharging opening 47d is formed, the air in the switch case 3 is discharged between the seal portion 47b and the sub seal portion 47c, which is discharged from the discharging opening 47d to the shaft hole", and means "in a case where the plural sub seal portions 47c are provided to be neighbored to each other, the air in the switch case 3 is discharged between the most downstream sub seal portion 47c and the seal portion 47b through the communicating openings 81 of the plural sub seal portions 47c in order from the upstream side to the downstream side and is discharged from the discharging opening 47d to the shaft hole". Therefore the labyrinth-shaped seal is formed as a whole to prevent the sudden blowout of the air in the switch case 3.

In the sealed switch, the shaft hole and the boss portion (48 or 18) having the communicating opening are formed in at least one of the lid body 35 and the substrate 10, and the boss portion (48 or 18) is formed in a columnar shape to be connected in a spigot joint manner to the coupler 72 connected to the pressure-reducing device (pressure-reducing pump 70 and the pressure-reducing line 71) for reducing the pressure in the switch case 3. Further, the seal ring 75 is interposed between the seating surfaces of the coupler 72 and the boss portion (48 or 18) for sealing the space between the seating surfaces, and the seating surface of the boss portion (48 or 18) to the seal ring 75 is formed as the mirror surface, preferably the mirror surface of Rz 6.3 (μm) or less. As the sealed switch is configured as above to form the seating surface of the boss portion (48 or 18) as the mirror surface, the tight contact properties of the seal ring 75 are improved to improve the air-tight properties. As a result, in a state where the suction of air from an outside at the pressure-reducing of the switch case 3 is blocked by the seal ring 75 and the coupler 72 adheres through the seal ring 75 to the seating surface of the boss portion (48 or 18) and the seating surface of the coupler 72, the pressure in the switch case 3 is reduced.

In the method for reducing the internal pressure in the aforementioned sealed switch, in a state where the seal ring 75 is arranged on the seating surface of the boss portion (48 or 18), the coupler 72 is fitted in the boss portion (48 or 18) in a spigot joint, and the coupler 72 is jointed to the pressure-reducing device. Thereby the pressure in the switch case 3 is reduced to the predetermined pressure or less by the pressure-reducing device while maintaining the spigot joint of the coupler 72 to the boss portion (48 or 18), and a signal of finish of the pressure reduction is outputted to the display device for display. Here, the predetermined pressure means a pressure which can suppress the leakage of the grease from the switch case 3. When the pressure in the switch case 3 is equal to or less than the atmospheric pressure, the finish of the pressure reduction is displayed on the display device. Therefore when the finish of the pressure reduction is displayed on the display device, the coupler 72 is removed from the sealed switch and the pressure reduction to a different sealed switch will be performed.

Figure 4:
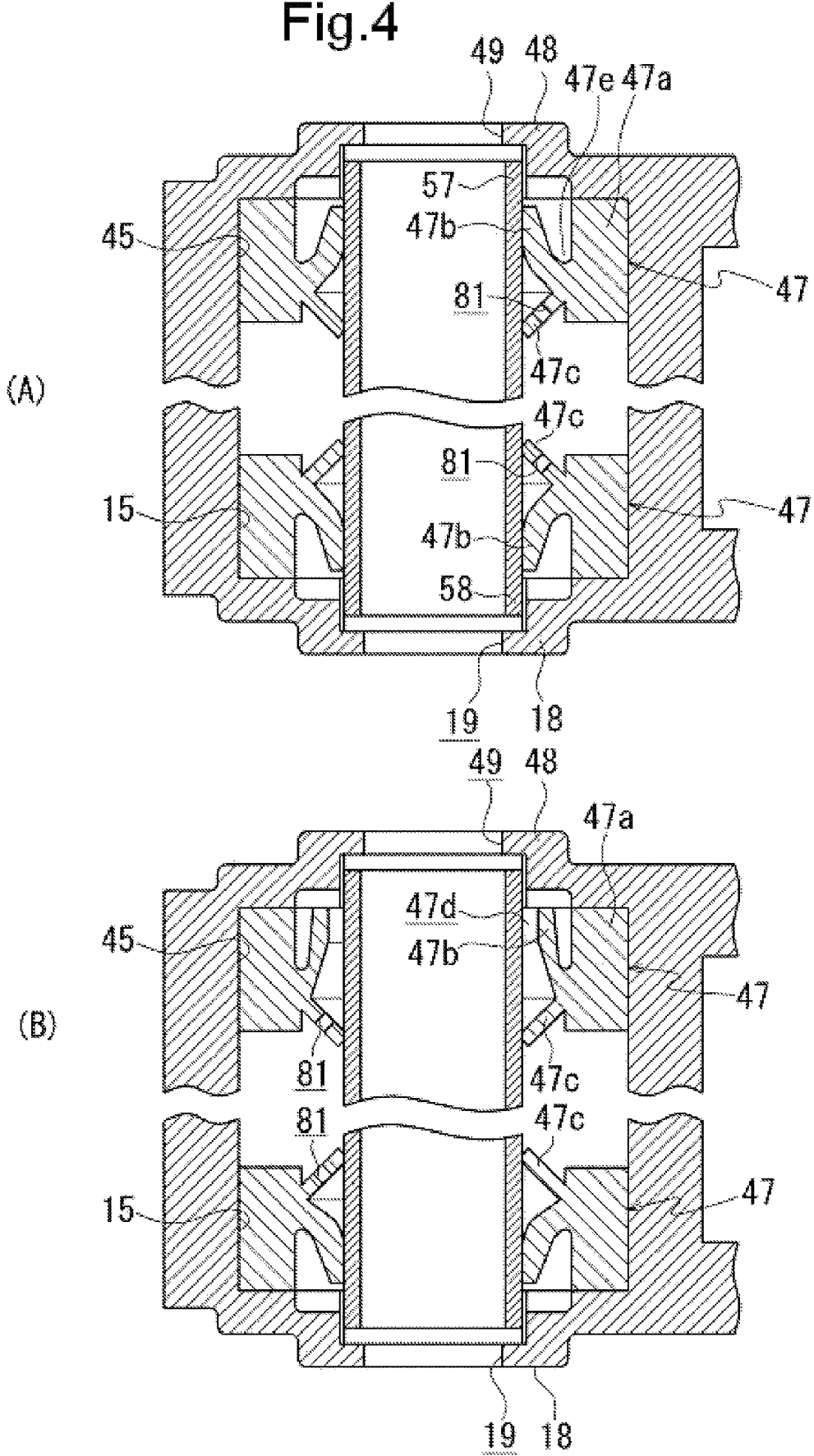
FIG. 4A and FIG. 4B are broken cross sections each showing a relation between shaft portions of a movable board and seal bearings according to the embodiment.

It should be noted that in the aforementioned embodiment, the explanation is made in such a manner that at least the tip end portion of the sub seal portion 47c regularly makes flexible contact with the rotary surface of the upper shaft portion 57 or the lower shaft portion 58, the communicating opening 81 formed of the hole or the notch is formed in the sub seal portion 47c, and at the pressure-reducing of the switch case 3, the labyrinth seal is formed (refer to FIG. 4). However, the communicating opening 18 is not formed in the sub seal portion 47c, and instead, an axial length of the sub seal portion 47c may be shortened to form a gap between the rotary surface of the upper shaft portion 57 or the rotary surface of the lower shaft portion 58 and the sub seal portion 47c, thereby forming the labyrinth seal. In addition, in the embodiment, the explanation is made in such a manner that the leakage of the grease is suppressed by reducing the pressure in the switch case 3 to the predetermined pressure, that is, a pressure equal to or less than an atmospheric pressure, but as long as the predetermined pressure is a pressure which can suppress the leakage of the grease, the predetermined pressure may be a pressure, for example, equal to or less than 12 KPa. When the predetermined pressure is reduced to the pressure equal to or less than this pressure, the pressure in the switch case 3 can be made to the pressure which can suppress the leakage of the grease. As a result, the effect similar to that of the aforementioned embodiment can be achieved. In addition, since the ring groove 30 for accommodating the seal ring 31 is provided on the top end surface 25 of the side wall 12 in the substrate 10, there is no possibility that the seal ring 31 drops at the time of pressing the lid body 35 onto the substrate 10, leading to the easy assembly.

It should be noted that in the aforementioned embodiment, the top end surface 25 of the side wall 12 in the substrate 10 corresponds to the end surface of the side wall 12 and corresponds to the overlap surface of the substrate 10 in the aspect of the present invention. In addition, the lower surface 38a of the flange portion 38 in the lid body 35 corresponds to the overlap surface of the lid body 35.

In the present embodiment, the ring groove 30 is arranged closer to the inside than the concave streak portion 26, but since the ring groove 30 has no affection on the sealing function of the switch case 3 by the seal ring 31, the ring groove 30 may be arranged closer to the outside than the concave streak portion 26.

In addition, in the present embodiment, the lid body 35 has the side wall 37, and the lower surface 38a of the flange portion 38 spreading from the lower edge of the side wall 37 is formed as the overlap surface facing the top end surface 25 of the side wall 12 in the substrate 10, functions as a seal surface making contact with the seal ring 31, and is formed as a portion of providing the projecting streak portion 40. However, in a case where the lid body 35 is formed in a flat shape with no side wall, a peripheral edge portion of the lower surface of the lid body 35 may be formed as the overlap surface.

Further, the welding inclination surface 27 is formed in the concave streak portion 26 and the welding shoulder portion 41 is formed in the projecting streak portion 40, but the present invention is not limited thereto, and as long as the welding between a part of the lid body 35 and a part of the substrate 10 is made possible by interference with each other, any shape may be adopted. The welding shoulder portion may be formed in the concave streak portion 26, and the welding inclination surface may be formed in the projecting streak portion 40.

Further, the projecting streak portion 40 may be provided in the substrate 10, and the concave streak portion 26 may be provided in the lid body 35. In addition, the ring groove 30 for accommodating the seal ring 31 is provided on the top end surface 25 of the side wall 12 in the substrate 10, but as needed, the ring groove 30 may be formed on the opposing surface of the lid body 35, and the top end surface 25 of the substrate 10 may be formed as the seal surface.

The present invention is high in convenience and effective in a case of being applied, particularly to a neutral start switch for a vehicular automatic transmission.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A sealed switch comprising:
a substrate;
a lid body overlapping the substrate to be joined integrally with each other;
a switch case formed of the substrate and the lid body;
a seal ring provided between overlapping surfaces of the substrate and the lid body to seal a space between the overlapping surfaces by flexible deformation of the seal ring;
a movable board arranged in the switch case and rotatably arranged between the substrate and the lid body;
movable contact points arranged on an opposing surface of the movable board to the substrate;
fixed contact points provided on opposing portions of the substrate to the movable contact points to be electrically connected to/disconnected from the movable contact points with rotation of the movable board;
a connecting piece portion formed integrally with the fixed contact point and extending inside the substrate by insert molding to the substrate to be exposed to an outside as a terminal of a connector portion in a side wall of the substrate;
an upper shaft portion and a lower shaft portion provided in a shaft portion of the movable board to rotatably support the shaft portion of the movable board to the substrate and the lid body;
shaft holes formed in the substrate and the lid body to rotatably support the upper shaft portion and the lower shaft portion through seal bearings respectively; and
communicating openings provided in the substrate and the lid body to communicate the shaft holes with an outside, wherein
at least one of the seal bearings includes a cylindrical body portion fitted in one of the shaft holes, and a lip-shaped seal portion provided in a lip shape on an inner peripheral surface of the body portion and making flexible contact with a rotary surface of the upper shaft portion or the lower shaft portion opposing the seal portion to seal an inside of the switch case, wherein the seal portion is flexibly separated from the rotary surface by a difference between a pressure in the communicating opening side reduced through the communicating opening and the shaft hole communicated with the communicating opening and a pressure in the switch case to form a discharging opening between the rotary surface and the seal portion for discharging an air in the switch case.

2. A sealed switch according to claim 1, wherein
a concave portion is provided between the backside of the seal portion and the body portion for promoting a flexible deflection of the seal portion.

3. A sealed switch according to claim 1, wherein
at least one sub seal portion is provided in the body portion at the side of the switch case to regularly make flexible contact with the rotary surface and cooperate with the seal portion for forming a labyrinth-shaped seal, and
a communicating opening formed of a hole or a notch is formed in the sub seal portion for passing the air in the switch case into the side of the seal portion closer to the shaft hole.

4. A sealed switch according to claim 1, wherein
a boss portion including the shaft hole and the communicating opening is formed in at least one of the lid body and the substrate, and is formed in a columnar shape to be connected in a spigot joint manner to a coupler connected to a pressure-reducing device for reducing the pressure in the switch case, and
a seal ring is interposed between seating surfaces of the coupler and the boss portion for sealing a space between the seating surfaces, wherein the seating surface of the boss portion to the seal ring is formed as a mirror surface.

5. A method for reducing an internal pressure in a sealed switch comprising:
- a substrate;
- a lid body overlapping the substrate to be joined integrally with each other;
- a switch case formed of the substrate and the lid body;
- a seal ring provided between overlapping surfaces of the substrate and the lid body to seal a space between the overlapping surfaces by flexible deformation of the seal ring;
- a movable board arranged in the switch case and rotatably arranged between the substrate and the lid body;
- movable contact points arranged on an opposing surface of the movable board to the substrate;
- fixed contact points provided on opposing portions of the substrate to the movable contact points to be electrically connected to/disconnected from the movable contact points with rotation of the movable board;
- a connecting piece portion formed integrally with the fixed contact point and extending inside the substrate by insert molding to the substrate to be exposed to an outside as a terminal of a connector portion in a side wall of the substrate;
- an upper shaft portion and a lower shaft portion provided in a shaft portion of the movable board to rotatably support the shaft portion of the movable board to the substrate and the lid body;
- shaft holes formed in the substrate and the lid body to rotatably support the upper shaft portion and the lower shaft portion through seal bearings respectively; and
- communicating openings provided in the substrate and the lid body to communicate the shaft holes with an outside, wherein
- a boss portion including the shaft hole and the communicating opening is formed in at least one of the lid body or the substrate, and is formed in a columnar shape to be connected in a spigot joint manner to a coupler connected to a pressure-reducing device for reducing the pressure in the switch case, and
- a seal ring is provided between seating surfaces of the coupler and the boss portion for sealing a space between the seating surfaces, wherein the seating surface of the boss portion to the seal ring is formed as a mirror surface, the method comprising:
- in a state where the seal ring is arranged on the seating surface of the boss portion, connecting the coupler to the boss portion in a spigot joint manner, and reducing the pressure in the switch case to a predetermined pressure or less by joining the coupler to the pressure-reducing device; and
- outputting a signal of finish of the pressure reduction to a display device.

* * * * *